(12) United States Patent
Rubino et al.

(10) Patent No.: US 11,201,482 B2
(45) Date of Patent: Dec. 14, 2021

(54) SOLENOID GENERATOR, CORRESPONDING ELECTRICAL SUPPLY SYSTEM AND DEVICE

(71) Applicant: OTTO S.R.L., Vicenza (IT)

(72) Inventors: Francesco Rubino, Vicenza (IT); Emanuele Castellano, Vicenza (IT)

(73) Assignee: Otto S.r.l., Vicenza (IT)

( * ) Notice: Subject to any disclaimer, the term of this patent is extended or adjusted under 35 U.S.C. 154(b) by 0 days.

(21) Appl. No.: 16/768,385

(22) PCT Filed: Nov. 27, 2018

(86) PCT No.: PCT/IB2018/059335
§ 371 (c)(1),
(2) Date: May 29, 2020

(87) PCT Pub. No.: WO2019/106525
PCT Pub. Date: Jun. 6, 2019

(65) Prior Publication Data
US 2020/0321790 A1    Oct. 8, 2020

(30) Foreign Application Priority Data

Nov. 30, 2017 (IT) .................... 102017000138366

(51) Int. Cl.
*H01F 7/08* (2006.01)
*H01F 27/24* (2006.01)
(Continued)

(52) U.S. Cl.
CPC .............. *H02J 7/0042* (2013.01); *H01F 7/08* (2013.01); *H01F 27/08* (2013.01); *H01F 27/24* (2013.01); *H01F 27/28* (2013.01); *H02J 7/35* (2013.01)

(58) Field of Classification Search
CPC .......... H02J 7/0042; H02J 7/35; H02J 50/001; H02J 50/20; H02J 50/27; H02J 7/32;
(Continued)

(56) References Cited

U.S. PATENT DOCUMENTS

2008/0074803 A1    3/2008 Yarger et al.
2009/0134721 A1*   5/2009 Zimmerling ........... H02K 35/02
                                                          310/15
(Continued)

FOREIGN PATENT DOCUMENTS

EP    2 882 092     6/2015
WO   2005/031952   4/2005

OTHER PUBLICATIONS

International Search Report and Written Opinion of the ISA for PCT/IB2018/059335 dated Jan. 17, 2019, 10 pages.

*Primary Examiner* — John W Poos
*Assistant Examiner* — Alex W Lam
(74) *Attorney, Agent, or Firm* — Nixon & Vanderhye P.C.

(57) ABSTRACT

A solenoid generator (11) comprises: —a first electrical winding (23) wound along a longitudinal axis (X11) of the generator; —a second electrical winding (24) wound along the aforesaid longitudinal axis (X11) of the generator around the first winding (23) so as to form, with respect to the first winding (23) a tubular chamber; and —an annular magnet (22) fitted around the first winding (23) and capable of relative movement with respect to the first winding (23) and to the second winding (24) in the aforesaid tubular chamber along the longitudinal axis (X11) of the generator. Preferential application is in power-supply systems for mobile/portable devices, such as mobile communication devices.

15 Claims, 4 Drawing Sheets

(51) Int. Cl.
*H01F 27/28* (2006.01)
*H02J 7/00* (2006.01)
*H01F 27/08* (2006.01)
*H02J 7/35* (2006.01)

(58) Field of Classification Search
CPC .... H02J 7/34; H02J 7/025; H01F 7/08; H01F 27/08; H01F 27/24; H01F 27/28; H05K 1/189; H02K 35/04; H02K 9/197; H02K 35/02; H02K 1/06; H02K 1/02; H02K 3/28; H02K 41/025; H02K 2207/03
See application file for complete search history.

(56) References Cited

U.S. PATENT DOCUMENTS

| | | | |
|---|---|---|---|
| 2009/0315414 A1* | 12/2009 | Shikayama | H02K 41/03 310/12.29 |
| 2010/0019610 A1* | 1/2010 | Saban | H02K 3/28 310/198 |
| 2012/0194008 A1* | 8/2012 | Iijima | H02K 35/02 310/30 |
| 2015/0091508 A1* | 4/2015 | Meunier | B60L 53/65 320/108 |
| 2015/0214823 A1 | 7/2015 | Shastry et al. | |
| 2016/0344226 A1* | 11/2016 | Wu | H02J 7/025 |

\* cited by examiner

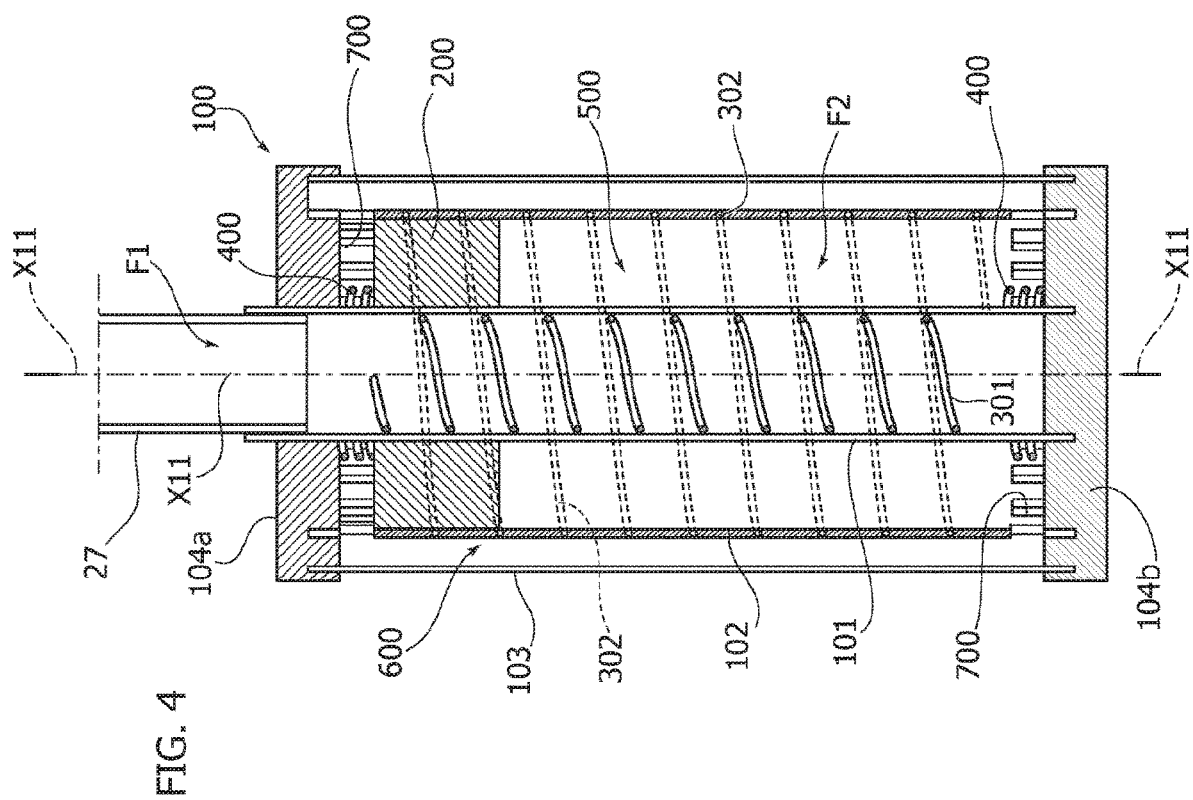

SOLENOID GENERATOR, CORRESPONDING ELECTRICAL SUPPLY SYSTEM AND DEVICE

This application is the U.S. national phase of International Application No. PCT/IB2018/059335 filed Nov. 27, 2018 which designated the U.S. and claims priority to IT Patent Application No. 102017000138366 filed Nov. 30, 2017, the entire contents of each of which are hereby incorporated by reference.

TECHNICAL FIELD

The present disclosure relates to electric generators.

One or more embodiments may apply, for example, to mobile devices such as mobile communication devices.

TECHNOLOGICAL BACKGROUND

The most common (portable) electronic mobile devices that are commercially available, such as mobile phones, smartphones, tablets, portable PCs, or notebooks, and similar devices (for example, remote controls or certain burglary devices), are affected by the problem of limited duration in time of the batteries with which they are equipped.

To overcome, at least in part, the problem of recharging these devices when it is impossible to gain access to an electrical mains supply, it is possible to use additional batteries external to the device, which, once connected to the device, provide for recharging of the battery integrated in the device itself, enabling the user to proceed with normal use of the device itself.

In a wide range of cases, it may prove problematical, if not impossible, to acquire a further component (such as the external auxiliary battery) to be carried around together with the mobile device. In any case, it is then necessary to provide for recharging, from the electrical mains supply, of the external auxiliary battery that, if need be, can be used in the cases of emergency, i.e., of low residual charge of the battery of the personal mobile device.

OBJECT AND SUMMARY

An object of one or more embodiments is to contribute to overcoming the drawbacks outlined above.

According to one or more embodiments, this object can be achieved by an electric generator having the characteristics set forth in the ensuing claims. One or more embodiments may regard a corresponding electric-power-supply system, and a corresponding device.

The claims form an integral part of the description of one or more embodiments as provided herein.

One or more embodiments may be used for providing an alternative supply for electrical devices, such as mobile devices, for example, mobile phones, smartphones, tablets, portable PCs, notebooks, and similar electronic devices.

One or more embodiments may be used for providing a supply system that can be integrated in a corresponding device.

One or more embodiments may be used for providing an electric power supply alternative to the one provided, for example, by an integrated battery.

One or more embodiments may make it possible to equip an electrical device, such as a mobile electronic device, with a supply system alternative to the one provided by a battery integrated in the device itself, this system being capable of supplying electric power directly to the components of the electronic device.

BRIEF DESCRIPTION OF THE DRAWINGS

One or more embodiments will now be described, purely by way of example, with reference to the annexed drawings, wherein:

FIG. 4 is a cross-sectional view according to the line III-III of FIG. 2; and

It will be appreciated that, for clarity and simplicity of illustration, the various figures may not be reproduced at the same scale.

DETAILED DESCRIPTION

In the ensuing description one or more specific details are illustrated, aimed at providing an in-depth understanding of the examples of embodiments of the ensuing description. The embodiments may be obtained with one or more of the specific details or with other methods, components, materials, and so forth. In other cases, known operations, materials, or structures are not illustrated or described in detail so that certain aspects of the embodiments will not be obscured.

Reference to "an embodiment" or "one embodiment" in the framework of the present description is intended to indicate that a particular configuration, structure, or characteristic described with reference to the embodiment is in conformance with at least one embodiment. Hence, phrases such as "in an embodiment" or "in one embodiment" or "in one (or more) embodiments" that may be present in one or more points of the present description do not necessarily refer precisely to one and the same embodiment. Moreover, particular conformations, structures, or characteristics, as exemplified with reference to any one of the figures, may be combined in any other altogether adequate way in one or more embodiments, as possibly exemplified in other figures.

The references used herein are provided merely for convenience and hence do not define the sphere of protection or the scope of the embodiments.

Figure 1:
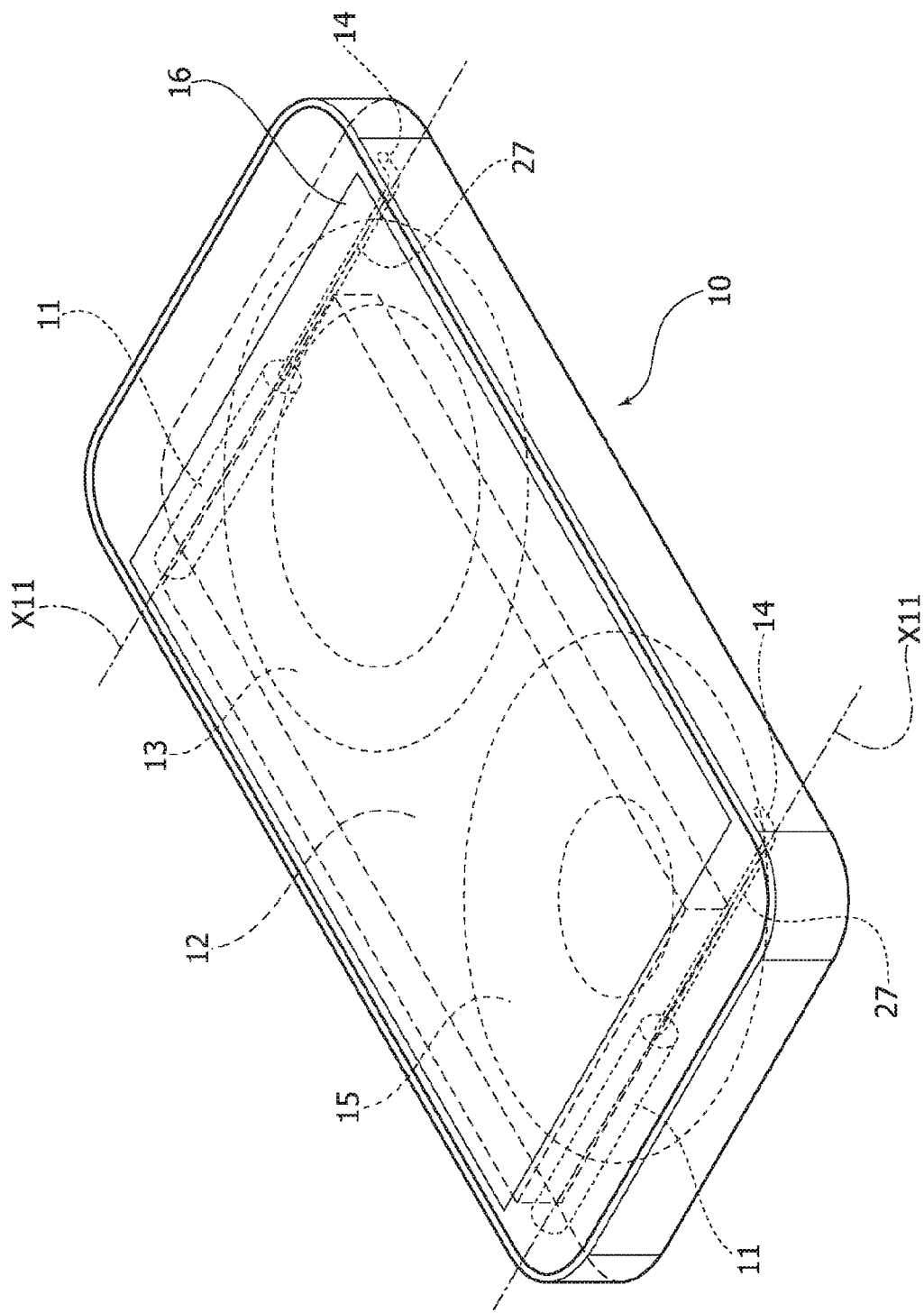
FIG. 1 illustrates an example of device that can use embodiments of the invention.

FIG. 1 is a perspective, partially see-through, view of a portable electronic device 10, for example, a mobile communication device, such as a smartphone that can be provided with an electrical-supply system.

For simplicity and clarity of illustration, FIG. 1 reproduces only some basic components of the supply system, it remaining on the other hand understood that the device 10 is to be deemed inclusive of all the other elements, such as transceivers, memories, displays, microphones, speakers, chambers, accelerometers (e.g., MEMS accelerometers), control processors, etc. that enable operation thereof according to well known criteria, which it is superfluous to recall herein.

One or more embodiments may envisage a system for electrical supply of the device 10 that can comprise one or more (e.g., two) solenoid generators 11, a battery 12, and one or more (e.g., two) antennas 13, 15.

In one or more embodiments, to the solenoid generator or to each solenoid generator (in what follows, for brevity, solenoid) 11 there may be associated a thermal-coupling conduit 14, which can set up a path for transmission of heat starting from a so-called heatpipe of the solenoid 11, as discussed in what follows, and the casing or body of the device 10.

In one or more embodiments, there may likewise be provided a photovoltaic-conversion film (the so-called solar film) 16, applied, for example, on an outer surface of the mobile device 10.

It will be appreciated that the possible location of the various parts discussed previously within the device 10 presented in FIG. 1 is provided purely by way of example and is hence not to be understood, even indirectly, as in any way limiting the embodiments.

In one or more embodiments, an optimal location within the device 10 may be defined according to the requirements of application and use, e.g., according to the type of the device 10 and of the remaining electronic components of the device 10 itself.

This may apply, for example, to the solar film 16, which, at least in principle, can be applied on any surface of the device 10 that has in some way the possibility of being intercepted by light radiation.

Figure 5:
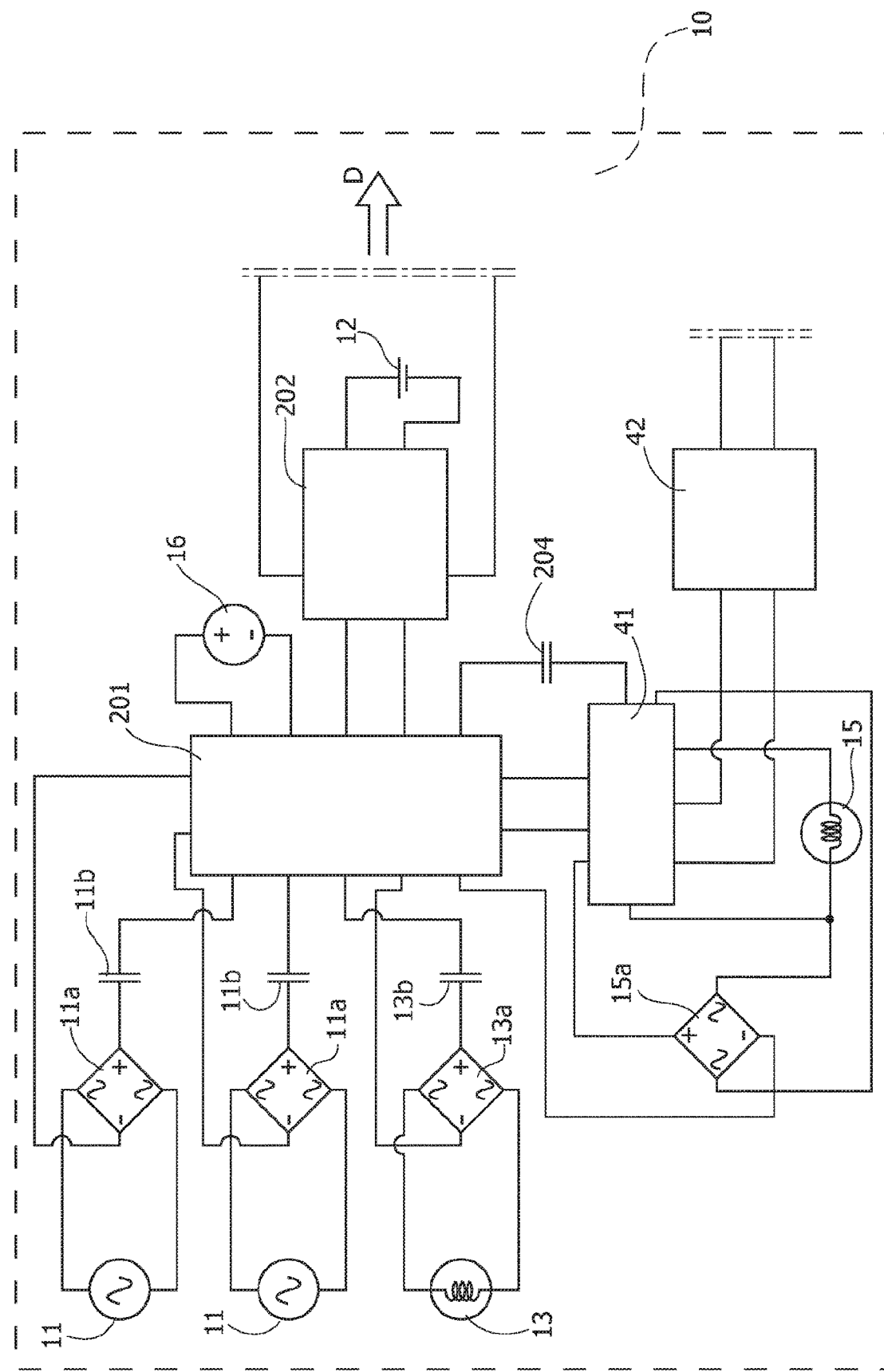
FIG. 5 is a block diagram provided by way of example of an electric-power-supply system that can use embodiments of the invention.

In one or more embodiments, the electromagnetic antenna or antennas 13, 15 may generate alternating current by capturing the electromagnetic waves present in the air and implementing, operating according to known criteria—possibly in co-operation with a power-manager circuit 201 and/or with a battery-manager circuit 202, discussed in what follows with reference to FIG. 5—a harvester circuit capable of storing the energy carried by the electromagnetic waves to be captured.

As is known, by "harvester circuit" is meant a circuit capable of "capturing" even very low energy levels (e.g., the electromagnetic wave captured by an antenna), and of storing it, after possible prior rectification, e.g., on a storage capacitor in view of subsequent use, for instance, for supply of one or more electrical components.

For example, in the case of a smartphone, it is possible to install one or more capacitors of this type on the motherboard of the device.

Optionally, it is possible to resort to a number of antennas, for instance, two antennas as schematically represented in FIG. 1.

In one or more embodiments, the antenna or antennas 13, 15 may be loop antennas, e.g., obtained with circular conductors.

In one or more embodiments that use a number of antennas (e.g., two antennas 13, 15) it is possible to use antennas that may have different turn ratios (i.e., densities of turns per section of the antenna, for example expressed in terms of number of turns per centimetres), thus optimising energy absorption.

For instance, in one or more embodiments it is possible to use a first electromagnetic antenna 13 of the spiral type with a wire having a diameter ranging between 0.2 mm and 1.2 mm, for example approximately 0.5 mm, and a density of between 4 and 17 turns/cm, e.g., 9 turns/cm.

Once again by way of example, the innermost turn of such an antenna may be located in a range of between 30% and 90%, for example approximately 64%, of the radius of the outermost turn.

Once again by way of example, the turns can be undulated with angles ranging between 1° and 8°, e.g., 3° per millimetre in the horizontal plane over a total height of the undulation comprised in a range of between 0.5 and 8 mm, e.g., 2 mm.

In one or more embodiments, the material of the antenna may comprise an alloy including 83% silver (Ag), 15% copper (Cu), and 2% zinc (Zn).

In one or more embodiments, it is possible to envisage the presence of an antenna (e.g., the second antenna 15) that can also function as an NFC (Near-Field Communication) antenna, implementing, according to known criteria—possibly in co-operation with an antenna-manager circuit 41 and/or with an NFC chip 42, described in what follows with reference to FIG. 5—a function that enables a device such as a smartphone or tablet to communicate in proximity conditions.

For instance, in one or more embodiments, the antenna 13 may be capable of absorbing energy also via recharging bases with Qi standard, i.e., according to the standard interface developed by Wireless Power Consortium for transmission of electrical energy via short-distance electromagnetic induction (e.g., up to 4 cm).

Once again by way of example, in one or more embodiments, the antenna 15 may be configured so as to be able to act either in electromagnetic-antenna mode or else as antenna for communication via the NFC protocol, where switching between the two operating modes can be controlled, for example via software, e.g., via one of the control chips of the device 10 (see, for example, the chip 42 of FIG. 5 described in what follows).

The fact that the two functions (pure electromagnetic antenna and NFC) may not be activatable simultaneously is, on the other hand, compensated for by the possibility of replacing a component already present in many mobile devices, thus optimising the space within the device 10, entrusting two different functions to just one component, in the case in point the antenna 15.

In one or more embodiments, the antenna 15 may be of the spiral type and completely flat with a wire having a diameter in a range of between 0.6 mm and 1.2 mm, for example approximately 0.8 mm, and with a density ranging between 4 and 17 turns/cm, e.g., 14 turns/cm. The innermost turn of the antenna may be located in a range of between 30% and 90%, for example approximately 42%, of the radius of the outermost turn.

In one or more embodiments, the solenoid or solenoids 11 are able to generate alternating current in response to the movement of the device 10 in a preferential direction, coinciding with a main axis X11 of the solenoid itself.

The above modality of generation of electrical energy renders one or more embodiments particularly suitable for use in mobile devices.

For instance, in one or more embodiments it is possible to envisage the presence of a number of solenoids 11 (e.g., as illustrated in FIGS. 1 and 5, a pair of solenoids 11) laterally anchored in the device 10 and/or with the main axes X11 of the solenoids 11 arranged parallel, for instance, along the shorter sides of the casing of the device 10.

By way of example, the solenoid 11 or each solenoid 11 may have a length (along the axis X11) of between 12 mm and 130 mm, e.g., approximately 49.2 mm, so as to enable, for example, its housing in a transverse position in the case of a smartphone.

The term "solenoid" commonly indicates a winding (coil) of a cylindrical shape, comprising a series of circular turns quite close to one another and obtained with just one wire of lacquered conductive material that extends along a helical path.

Figure 3:
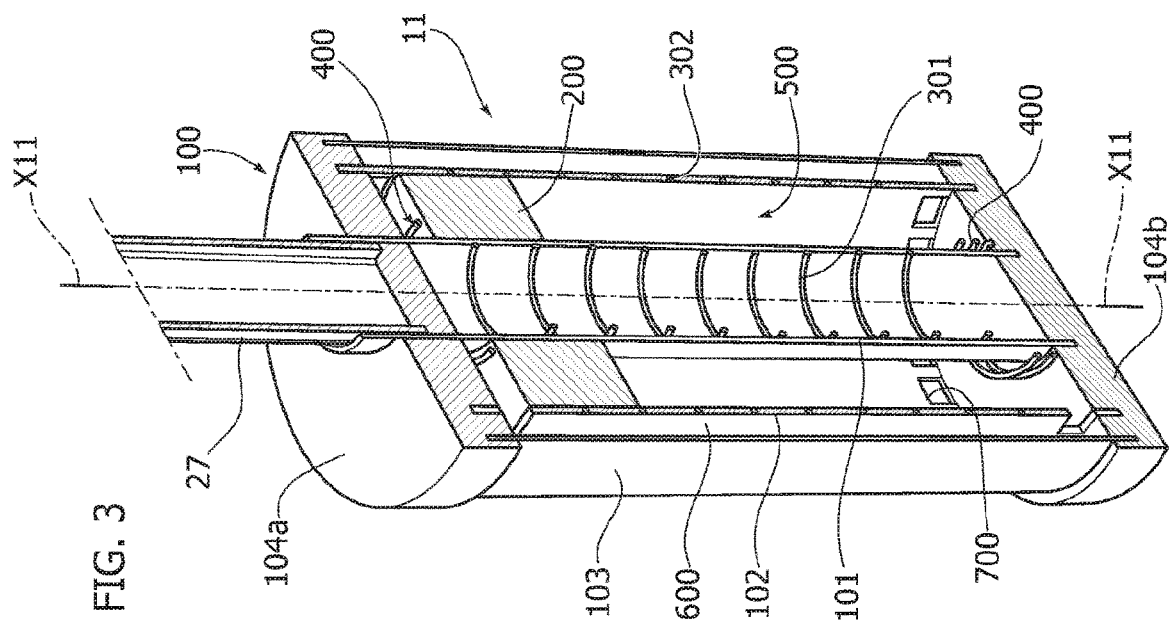
FIG. 3 is a perspective view of a generator according to FIG. 2 illustrated in cut-away view.
Figure 2:
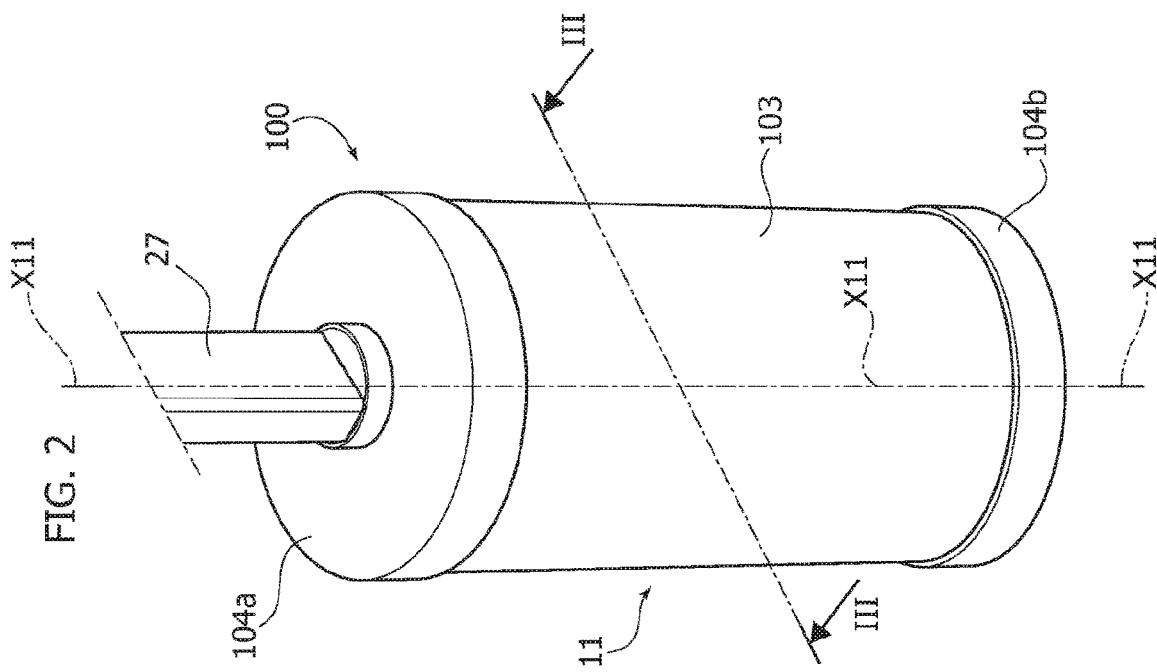
FIG. 2 is a general perspective view of a generator according to the embodiments.

FIGS. 2 to 4 illustrate an example of such a solenoid 11, respectively, in perspective view, in perspective view cut in a diametral plane (where consequently one of the two halves of the solenoid is represented, which are to be understood specularly symmetrical with respect to the aforesaid diametral plane), and in diametral cross section.

In one or more embodiments, the solenoid 11 or solenoids 11 (one of which will be described in detail hereinafter) may comprise a casing 100, mobile inside which—in alternating directions and along the longitudinal axis X11 of the solenoid 11—is a magnet 200.

In one or more embodiments, the casing of the solenoid 11 (which may comprise plastic and/or metal material that is optionally a good conductor of heat and/or capable of facilitating movement in alternating directions of the magnet 200) may have an as a whole tubular shape and comprise, for example, three cylindrical linings, namely an inner one 101, an intermediate one 102, and an outer one 103, arranged (coaxial) inside one another aligned with the axis X11.

In one or more embodiments, the casing of the solenoid 11 is closed by two end lids 104a and 104b coupled to the ends of the linings 101, 102, and 103 (see, for example, FIG. 4) so as to define:

a first tubular chamber 500 (with annular cross section) comprised between the inner lining 101 and the intermediate lining 102; and
  a second tubular chamber 600 (with annular cross section) external with respect to the chamber 500 in so far as comprised between the intermediate lining 102 and the outer lining 103.

In one or more embodiments, the inner lining 101 may define a central core of the casing 100, slidingly fitted on which is the magnet 200, having, for example, an annular shape, such as a doughnut shape. The magnet 200 can thus move from one end to the other of the chamber 500 of the solenoid 11 as a result of the movement imparted on the solenoid itself (for example, in so far as it is mounted in the device 10 that is being moved).

In one or more embodiments, the magnet 200 may have a closed-ring shape.

By way of example, in one or more embodiments, the magnet 200 may comprise material such as neodymium with a thickness of for example 5 mm.

In one or more embodiments, the inner lining or core 101 of the solenoid 11 may have (compatibly with the requirement of enabling sliding of the magnet 22) a diameter of between 1 mm and 8 mm, for example approximately 2 mm.

It will on the other hand be appreciated that the dimensional values given in the present description are to be understood as purely orientative and provided by way of example, and hence in no way limit the scope of the embodiments.

In one or more embodiments, on the central core of the casing of the solenoid (e.g., on the inner wall of the lining 101) the may be wound, in a first winding direction, a first branch 301 of the winding of the solenoid 11.

In one or more embodiments, on the intermediate wall 102 of the casing of the solenoid (which surrounds the lining 101) there may be wound, in a second winding direction (which is the same as or different from the first), a second branch 302 of the winding of the solenoid 11.

In one or more embodiments, the above winding branches may be winding branches with a single layer of a wire having a diameter of between 0.1 mm and 1.3 mm, e.g., approximately 0.4 mm.

In one or more embodiments, the two branches 301 and 302 of the winding can extend along the length of the solenoid 11, for example with the first branch 301 that, starting from the top end, reaches the bottom end of the inner lining or core 101 in FIGS. 2 to 4 and the second branch 302 that, starting from the bottom end, reaches the top end of the intermediate lining 102 in FIGS. 2 to 4.

In one or more embodiments, the first branch 301 of the winding of the solenoid 11 may have dimensions approximately corresponding to those of the inner lining or core 101, for instance, a diameter of between 1 mm and 8 mm, for example, approximately 2.5 mm.

In one or more embodiments, the second branch 302 of the winding of the solenoid 11 may have dimensions approximately corresponding to the dimensions of the intermediate lining 102, hence slightly larger than the external dimensions of the magnet 200, for instance, a diameter of between 3 mm and 14 mm, for example, approximately 7.5 mm.

In one or more embodiments, at the opposite ends of the chamber 500 comprised between the inner lining 101 and the intermediate lining 102 of the solenoid 11 there may be provided a pair of elements (e.g., springs or circlips) 400, which have, for example (according to the length of the solenoid), a height comprised between 2 mm and 15 mm, for instance, approximately 4 mm.

In one or more embodiments, simple movement exerted by the user and/or by external force (gravity) on the device 10 (hence, on the solenoid 11) is able to generate displacement of the magnet 200 along the axis X11 within and along the chamber 500, with consequent generation of electromotive force (e.m.f.), and hence of electric power in the windings 301 and 302.

In one or more embodiments, the two windings 301 and 302 may be coupled together so that the respective actions of generation of electromotive force co-operate in a constructive way.

For instance, in one or more embodiments, it is possible to connect the two windings 301, 302 in series to one another (e.g., with wires—not visible in the figures—at one of the ends of the casing of the solenoid), choosing the directions of the windings 301, 302 so that the voltages across the two windings will be of a mutually concordant sign in both directions of movement of the magnet 200, constructively adding to one another.

In one or more embodiments, it is possible to connect the two windings 301, 302 in parallel to one another (e.g., with wires—not visible in the figures—at both ends of the casing of the solenoid) so that the currents generated by the two windings will be of a mutually concordant sign in both directions of movement of the magnet 200, constructively adding to one another.

In one or more embodiments, thanks to the presence of the two windings 301 and 302, it is possible to obtain an overall increase of energy produced of approximately 43% with respect to a solution that uses just one winding.

In one or more embodiments, the possible presence of the elastic means 400 (e.g., located at the lids 104a and 104b) can facilitate the system in the absorption of energy in the presence of rates of reversal of motion higher than one change of direction of motion every 1.8 s and, at the same time, is able to reduce the noise generated by the system.

In one or more embodiments, as exemplified in FIGS. 2 to 4, the inner lining or core 101 of the solenoid may be hollow and/or be coupled, for example, to a conduit 27 (see FIG. 1), such as a so-called heatpipe, that may be connected (for example in 14, see once again FIG. 1) to the casing or body (which is made, for example, of thermally dissipative material) of the device 10, for instance, on the rear surface, the aim being to preserve the possibility of positioning the solenoid 11 or solenoids 11 within the device 10 according to the requirements of application or use, for example, in the proximity of and/or in contact with the components most liable, for instance in the long term, to generate heat.

In one or more embodiments, for example, in the case where the device 10 is a smartphone with a metal frame, the heatpipe or heatpipes 27 can extend in the lower and upper areas of the frame, which are less exposed to contact with the user.

In one or more embodiments, the conduit 27 (which may extend through the end lid 104a and have an annular shape) may be a flat conduit (for example, with an approximately flattened, rectangular or elliptical, cross section) so as to facilitate location thereof within the device 10.

In one or more embodiments, the conduit 27 (and/or the core 101 of the solenoid 11, which, as has been seen, may be hollow) may contain a filling—designated as a whole by F1 in FIG. 4—of a diathermic medium (capable of exchanging and conveying heat), such as ethylene glycol, possibly at least slightly depressurised, for example, at approximately 0.8 atm.

This solution may prove particularly suited considering the operating temperatures, for example, those present in a smartphone.

For instance, in one or more embodiments, the core (inner lining) 101 of the solenoid 11 and the associated heatpipe 27 may comprise an alloy (20% silver/80% copper), with possible variations of 7% in ratio, with the (first) branch 301 of the winding electrically insulated with respect to the core 21, according to known criteria.

In one or more embodiments, it is possible to size the magnet 200 and the tubular chamber 500 in which it slides with reciprocating motion (chamber comprised between the inner lining or core 101 and the intermediate lining 102) so that the magnet 22 presents a thickness comprised between a minimum value equal to $\frac{1}{10}$ of the length of the solenoid 11 and a maximum value equal to one quarter of the length of the solenoid 11.

In one or more embodiments, it is possible to size the magnet 200 and the chamber 500 so that the magnet 200 will act in the chamber 500 as a sort of plunger, with the chamber 500 communicating with the outer chamber 600 comprised between the intermediate lining 102 and the outer lining 103 of the casing of the solenoid 11 through openings 700 situated at the homologous ends of the chambers 500 and 600 (i.e., in the proximity of the lids 104a and 104b).

In one or more embodiments, the openings 700 may enable transfer between the chambers 500 and 600 (in the two directions, according to the direction of movement of the magnet 200) of a filling of ferrofluid liquid and gas, designated as a whole by F2 in FIG. 4.

For instance, with reference to the point of observation of FIG. 4:
  if the magnet 200 displaces downwards, the fraction of the aforesaid filling that is located underneath the magnet passes from the chamber 500 into the chamber 600 through the openings 700 situated underneath, i.e., close to the lid 104b, whereas a corresponding fraction of the aforesaid filling passes from the chamber 600 to the part of chamber 500 situated above the magnet 200 through the openings 700 situated above, i.e., close to the lid 104a; and
  if the magnet 200 displaces upwards, the fraction of the aforesaid filling that is located above the magnet passes from the chamber 500 into the chamber 600 through the openings 700 situated above, i.e., close to the lid 104a, whereas a corresponding fraction of the aforesaid filling passes from the chamber 600 to the part of chamber 500 situated underneath the magnet 200 through the openings 700 situated underneath, i.e., close to the lid 104b.

All this being considered, it is also to be taken into account that the gaseous component of the ferrofluid-gas filling F2 is to undergo reduction in volume when it is subjected to compression, behaving in effect like an elastic element.

As is known, a ferrofluid is a liquid that undergoes marked biasing in the presence of a magnetic field. A ferrofluid may comprise ferromagnetic (nano)particles suspended in a fluid carrier, such as an organic solvent or else water. The ferromagnetic nanoparticles may be coated with a surfactant for preventing their agglomeration (due to the van der Waals forces of organic chemistry and to magnetic forces).

Even though the name might suggest the opposite, the ferrofluids do not usually exert ferromagnetism, since they do not present magnetisation in the absence of a field applied from outside.

In effect, ferrofluids present paramagnetism, and it is frequently said that they are "superparamagnetic" on account of their high magnetic susceptibility.

For instance, in one or more embodiments, the filling F2 may comprise, in an amount of from 35% to 70%, e.g., approximately 48%, CMS Magnetics® Magnetic Ferrofluid available from CMS MAGNETICS, INC., Garland, Tex., USA with a percentage of magnetic solids of, for example, approximately 3% (with respect to the aforesaid value of 48%, hence in an amount at least slightly less than standard ferrofluids, with approximately 5% of magnetic solids), with the remaining part of the chambers 500 and 600 left free by the magnet 200 occupied by gas, for example xenon in the gaseous state, optionally with complete removal of oxygen (air).

The aforesaid percentage values refer to the volume, assuming for the gaseous component (e.g., xenon) the pressure of 1 bar.

A ferrofluid liquid is exposed to the phenomenon known as normal field instability, a phenomenon whereby in a paramagnetic fluid subjected to a sufficiently intense vertical magnetic field, the surface spontaneously forms a regular sequence of crimps (i.e., crests). In one or more embodiments, onset of this phenomenon may lead to an increase of the relative efficiency of the solenoid 11.

In one or more embodiments, the filling F2 of ferrofluid and gas may maintain the magnet 200 aligned and at least approximately equidistant from the walls of the inner lining or core 101 and of the intermediate lining 102, thus enabling reduction of the friction of displacement thanks to the joint effect of its lubricant properties and of the physical repulsion with respect to the walls.

Another possible effect of the ferrofluid liquid is the reduction of the noise of movement, in the change of direction and at arrest of travel, thanks to the surface structure created as a result of the normal field instability.

Owing to the normal field instability, there may likewise be created, in the proximity of the magnet 200 that moves in the chamber 500, crests containing gas (e.g., xenon) inside them.

In one or more embodiments, the diamagnetism of xenon can affect movement of the magnet 200, decelerating it or accelerating it in relation to the distance from the central point of the solenoid (for example, approximately half-way between the lids 104a and 104b), with the effect of deceleration/acceleration that decreases exponentially as the distance increases.

Creation of more harmonic waves due to xenon, in the presence of high rates of reversal of motion enables reduction of the workload of the energy-control chip, with consequent reduction of the operating temperatures and increase in the overall system efficiency (which, given the different densities of xenon and of the ferrofluid and given the forces acting in the system, it is found to be maximum in the presence of inclinations of 52° with respect to the horizontal axis).

In one or more embodiments, in the device 10, in addition to the aforesaid components just described there may be envisaged also application, for example outside the device 10, of a solar film 16 (of a known type) with variable transparency, having the purpose of converting the energy captured by the light radiation into electrical energy to be exploited jointly with the energy generated both by the electromagnetic antennas 13, 15 and by the solenoids 11.

The diagram of FIG. 5 exemplifies possible modalities of co-operation, in a device 10, of the solenoids 11, the battery 12, the electromagnetic antennas 13, 15, and the film 16.

Of course, in the case of the representation of FIG. 5, the circuit diagram provided has only purposes of example that does not encompass the entire layout of the PCB (printed-circuit board) of the device: for example, the lines on the right in FIG. 5 are assumed as being connected to other chips of the device 10, which are to be deemed in themselves known (not visible in FIG. 5). They may, for example, be user circuits or chips D that are connected to the battery manager 202 and that hence may be supplied thereby, or else communication components, which are connected to the NFC chip 42.

In the example illustrated in FIG. 5, the two solenoids 11 and the antenna 13 are connected to the power manager 201 via respective rectifiers 11a, 13a with associated capacitors 11b, 13b.

FIG. 5 refers, by way of example, to a device 10 in which for the second antenna 15 also operation as NFC antenna is envisaged, so that control circuits or controllers are present (the antenna manager 41 and the NFC chip 42) that make it possible to alternate the functions via software.

In one or more embodiments, the power manager 201 may be configured (in a way in itself known) so as to define the energy flows of the battery manager 202 for supply of the components of the device 10 (for example, the ones denoted by D).

In one or more embodiments, the power manager 201 may be configured so as to detect the level of energy produced by the alternative system here exemplified (e.g., antennas 13, 15, solenoid/solenoids 11, and solar film 16) and consequently supply the components of the mobile device 10 either by means of the supply system exemplified herein or else by means of the battery 12 with which the mobile device is already in any case equipped.

In one or more embodiments, the battery manager 202 may be configured (also here in a way in itself known) so as to manage charge of the battery 12 when the device 10 is connected to a charger (e.g., a USB charger) and supply of power by the battery 12 (and hence discharge thereof) when the energy produced by the system (for example, antennas 13, 15, solenoid/solenoids 11, and solar film 16) is not sufficient.

In one or more embodiments, the battery manager 202 can operate (for example, under the control of the power manager 201) so as to apply to the components D, at least primarily, the electric power supply coming from the supply system that comprises the electromagnetic antennas 13 and 15, the solenoids 11, and the film 16, so as to "save" the battery 12, this likewise envisaging, in the case where the energy produced by the aforesaid system is not sufficient, supply of the user components by the battery 12.

Even though in one or more embodiments, as exemplified herein, to the supply system here described there may not be entrusted the function of recharging the battery 12, this possibility is not to be deemed altogether excluded from the realm of the possible embodiments.

As already mentioned previously, in one or more embodiments, the electromagnetic antenna 15 may be of an NFC type and be subjected to the control of the chip 42. For instance, the chip 42 can be rendered active, for example, via a transistor set in switch mode, when the device 10 is used by the end user, i.e., when the screen is on, whereas when it is in stand-by mode, it functions as electromagnetic antenna, supplying energy to the components D of the mobile device.

It will be appreciated that, whereas one or more embodiments as exemplified herein envisage use, for the purposes of generation of the electrical signal in the solenoid 11, of a mobile-magnet solution, with the magnet 200 that moves along the axis X11 in the chamber 500 of the solenoid 11, one or more embodiments may envisage use of a mobile-coil solution, for example with the magnet 200 supported (for instance, via an axial support) in a fixed position in the chamber 500, with the relative movement between the magnet 200 and the windings 301 and 302 obtained as a result of the movement of the casing of the solenoid with respect to the magnet 22, or else a hybrid solution between a mobile-magnet solution and a mobile-coil solution.

Once again, it will be appreciated that, whereas one or more embodiments as exemplified herein envisage providing the "compensation" chamber 600 on the outside of the winding branch 302 (on the outside of the chamber 500 in which the magnet 200 moves), one or more embodiments may envisage providing the chamber 600 inside the winding branch 302 (for example, inside the core 101), possibly shifting the heat-dissipation function (pipe 27) on the outside of the chamber 500, where, in the embodiments exemplified herein, the chamber 600 is located.

Without prejudice to the underlying principles, the details and the embodiments may vary, even appreciably, with respect to what has been described herein purely by way of example, without thereby departing from the extent of protection, which is determined by the annexed claims.

The invention claimed is:

1. A solenoid generator, comprising:
   a first electrical winding wound along a longitudinal axis of the generator,
   a second electrical winding wound along said longitudinal axis of the generator around said first winding, with a tubular chamber between the first and the second winding,
   an annular magnet arranged around said first winding and adapted for relative movement with respect to said first winding and said second winding in said tubular chamber along said longitudinal axis of the generator,
   a compensation chamber in fluid transfer relationship with said tubular chamber, said tubular chamber and said compensation chamber containing a filling of ferrofluid liquid and gas,
   wherein, in said filling of said tubular chamber and said compensation chamber;

said ferrofluid liquid and gas comprises from 35% to 70% ferrofluid liquid, the remaining portion occupied by gas;

said ferrofluid liquid contains a percentage of magnetic solids of about 3%;

said gas comprises xenon.

2. The solenoid generator of claim 1, comprising a core onto which said first winding is wound.

3. The solenoid generator of claim 1, wherein said magnet comprises neodymium.

4. The solenoid generator of claim 1, comprising, on at least one of the ends of said tubular chamber, an elastic abutment member for said magnet.

5. An electrical supply system, comprising:
at least one solenoid generator according to claim 1, and
at least one further electrical generator selected out of:
an antenna capturing electromagnetic energy, and
a photovoltaic conversion film.

6. The electrical supply system of claim 5, comprising at least one antenna capturing electromagnetic energy selectively activatable as an NFC proximity communication antenna.

7. An electrical device, comprising a solenoid generator according to claim 1.

8. An electrical device, comprising an electrical supply system according to claim 5.

9. The electrical device of claim 7, comprising a mobile or portable device.

10. The solenoid generator of claim 2, wherein said core is hollow and/or coupled with a heat dissipation conduit.

11. The solenoid generator of claim 10, wherein:
said core and/or said heat dissipation conduit contain a filling of diathermic medium; and/or
said heat dissipation conduit has a flattened shape.

12. The solenoid generator of claim 11, wherein said core and/or said heat dissipation conduit contain a filling of diathermic medium, at controlled pressure.

13. The solenoid generator of claim 1, wherein the compensation chamber is outward of the tubular chamber.

14. The solenoid generator of claim 1, wherein the ferrofluid liquid and gas comprises 48% ferrofluid liquid, the remaining portion occupied by gas.

15. The electrical device of claim 9, wherein the mobile or portable device is a mobile communication device.

* * * * *